No. 805,537. PATENTED NOV. 28, 1905.
G. A. GILBERT.
PULLEY.
APPLICATION FILED JULY 6, 1903.
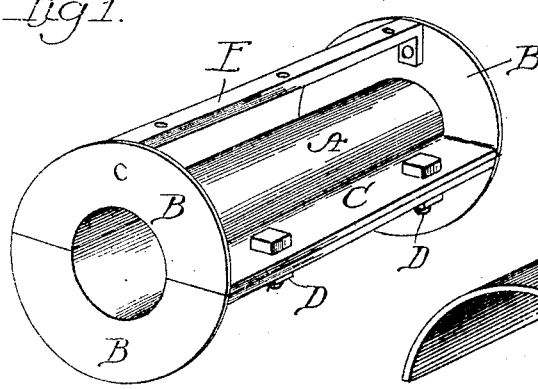
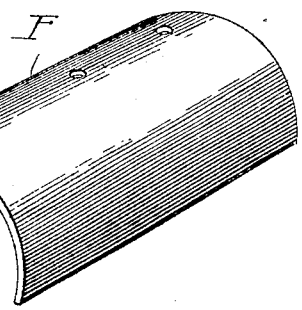
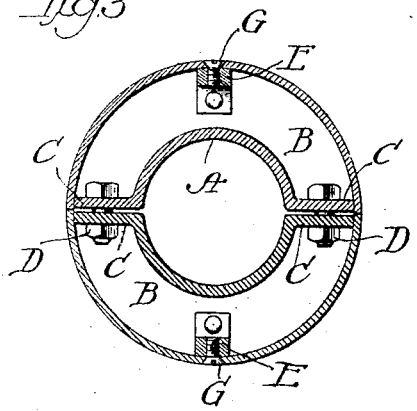
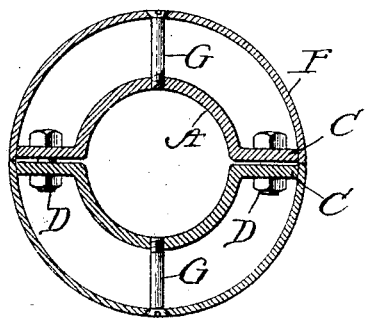
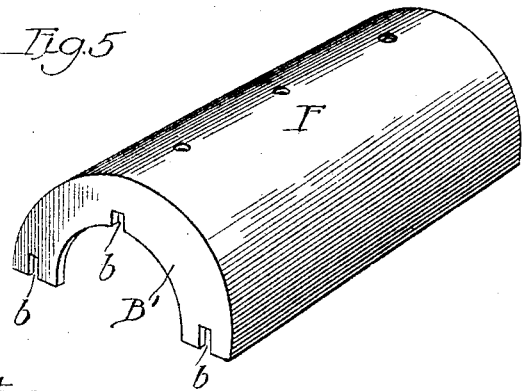
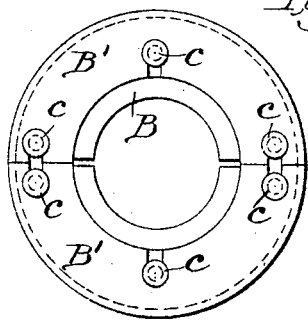
Witnesses:
Harold G. Barrett.
Lute S. Alter.
Inventor
George A. Gilbert
By Rector & Hibben
his Att'ys

UNITED STATES PATENT OFFICE.

GEORGE A. GILBERT, OF CHICAGO, ILLINOIS.

PULLEY.

No. 805,537.     Specification of Letters Patent.     Patented Nov. 28, 1905.

Application filed July 6, 1903. Serial No. 164,425.

*To all whom it may concern:*

Be it known that I, GEORGE A. GILBERT, a citizen of the United States, residing at Chicago, in the county of Cook and State of Illinois, have invented certain new and useful Improvements in Pulleys, of which the following is a description, reference being had to the accompanying drawings, forming part of this specification.

My invention relates primarily to belt-pulleys, and more particularly to pulleys of small size; but it may also be utilized for other purposes, such as shaft-couplings, as hereinafter explained. It has for its object the construction of a simple, cheap, and efficient structure of this character from sheet metal.

In the accompanying drawings, Figure 1 is a perspective view of one form of pulley embodying my invention with the outer shell removed; Fig. 2, a perspective view of one-half of such outer shell; Fig. 3, a cross-sectional view of the complete pulley; Fig. 4, a corresponding view showing a modification in construction; Fig. 5, a perspective view of one-half of the outer shell of the pulley corresponding to Fig. 2, but provided with end flanges; Fig. 6, an end view of the pulley structure of Fig. 1, provided with the outer shell of Fig. 5.

The same letters of reference are employed to indicate corresponding parts in the several views.

The foundation of my novel pulley structure comprises the hub portion A, end flanges B, and side flanges C, (shown in Fig. 1,) said parts for each half of the pulley being composed of a single integral piece of sheet metal formed into shape in suitable dies. This two-part structure is applied to the shaft and clamped thereto by the bolts D, passed through the side flanges C, the hub portion A of each half of the pulley being a trifle less than a half-cylinder, so as to leave open clamping-space between the opposing flanges C. The pulley is completed by adding an outer two-part covering or shell and suitably securing it to the structure above described. This may be done in various ways. In Fig. 1 I have shown a bar E extending longitudinally of the pulley and secured at its opposite ends to the end flanges B, the outer surface of this bar being flush with and conforming to the periphery of the end flanges B and a similar bar being provided upon the opposite half of the pulley, but not shown in Fig. 1. Two plain sheet-metal half-cylinders F constitute the outer shell or covering of the pulley in such instance and are secured to the respective halves of the pulley by screws G, passed through holes provided for them in the shell and entering threaded holes in the bars E, as shown in Fig. 3. The bars E may be dispensed with and longer screws G be provided, as in Fig. 4, the inner ends of such screws in such instance entering threaded holes provided for them in the hub portion A of the pulley structure.

In Figs. 5 and 6 I have shown the employment of a preferred construction of the outer shell or covering for the pulley in which the semicylindrical halves F of Fig. 2 are provided with end flanges B', adapted to fit over and against the outer sides of the end flanges B of the structure of Fig. 1 and provided with slots or notches $b$, adapted to engage studs or rivets $c$, secured in and projecting from the end flanges B, as shown in Fig. 6, said studs or rivets having heads upon their outer ends, between which and the end flanges B the flanges B' of the outer shell F are confined.

As will be understood from the foregoing, my invention may be utilized in shaft-couplings as well as in pulleys, either the exact construction illustrated and described being employed as a shaft-coupling or such features as are peculiarly necessary for the purposes of a pulley being omitted.

Having thus fully described my invention, I claim—

1. The herein-described sheet-metal structure for pulleys and the like, comprising the two halves, each composed of a hub portion A, end flanges B and side flanges C, and clamping-bolts D passed through the flanges C, and the two-part outer shell or covering F secured to said structure; substantially as described.

2. The herein-described sheet-metal structure for pulleys and the like, comprising the two halves, each composed of a hub portion A, end flanges B and side flanges C, the clamping-bolts D passed through the flanges C, and the two-part outer shell or covering F secured to said structure and having the end flanges B' overlapping the end flanges B thereof; substantially as described.

3. The herein-described sheet-metal structure for pulleys and the like, comprising the two halves, each composed of the hub portion A, end flanges B provided with the projecting studs or rivets $c$, and the side flanges C, the clamping-bolts passed through the flanges C, and the two-part outer shell or covering secured to said structure and provided with the end flanges B' overlapping the end flanges B of said structure and having the notches b engaging the studs or rivets c; substantially as described.

4. The herein-described sheet-metal structure for pulleys and the like, comprising the two halves, each composed of the hub portion A, end flanges B and side flanges C, and each having secured in it the longitudinal bar E, the clamping-bolts passed through the flanges C, the two-part outer shell or covering F secured to said structure, and screws passed through said shell and entering the bars E for so securing the shell to said structure; substantially as described.

5. The herein-described sheet-metal structure for pulleys and the like, comprising the two halves, each composed of the hub portion A, end flanges B and side flanges C, and each having secured in it the longitudinal bar E, the clamping-bolts passed through the flanges C, the two-part outer shell or covering F, and screws passed through the latter and entering the bars E for securing the shell to said structure, said two-part shell F being provided with the end flanges B' overlapping the end flanges B of the inner structure; substantially as described.

GEO. A. GILBERT.

Witnesses:
    EDWARD RECTOR,
    LOUIS B. ERWIN.